(12) United States Patent
Kapinos et al.

(10) Patent No.: US 11,451,766 B1
(45) Date of Patent: Sep. 20, 2022

(54) DEVICE AND METHOD FOR CONTROLLING COMMUNICATION OF INFORMATION

(71) Applicant: Lenovo (Singapore) Pte. Ltd., New Tech Park (SG)

(72) Inventors: Robert J. Kapinos, Durham, NC (US); Scott Li, Cary, NC (US); Robert James Norton, Jr., Raleigh, NC (US); Russell Speight VanBlon, Raleigh, NC (US)

(73) Assignee: LENOVO (SINGAPORE) PTE. LTD., New Tech Park (SG)

( * ) Notice: Subject to any disclaimer, the term of this patent is extended or adjusted under 35 U.S.C. 154(b) by 0 days.

(21) Appl. No.: 17/328,581

(22) Filed: May 24, 2021

(51) Int. Cl.
| | |
|---|---|
| *H04N 7/15* | (2006.01) |
| *H04N 17/00* | (2006.01) |
| *H04N 7/14* | (2006.01) |
| *H04N 7/18* | (2006.01) |

(52) U.S. Cl.
CPC ........... *H04N 17/002* (2013.01); *H04N 7/147* (2013.01); *H04N 7/15* (2013.01); *H04N 7/183* (2013.01); *H04N 2201/0017* (2013.01)

(58) Field of Classification Search
CPC   H04N 17/00; H04N 7/15; H04N 7/18; H04N 7/14
USPC ........................................... 348/14.01–14.16
See application file for complete search history.

(56) References Cited

U.S. PATENT DOCUMENTS

| | | | |
|---|---|---|---|
| 2005/0068423 A1* | 3/2005 | Bear | H04N 5/23203 348/207.99 |
| 2015/0341491 A1* | 11/2015 | Lau | H04N 7/141 348/14.02 |

FOREIGN PATENT DOCUMENTS

| | | | | |
|---|---|---|---|---|
| CN | 111601066 A | * | 8/2020 | |
| JP | 2012186782 A | * | 9/2012 | H04N 7/15 |
| WO | WO-2020189806 A1 | * | 9/2020 | B60K 35/00 |

OTHER PUBLICATIONS

Portable Terminal and Its Image Transfer and Screen Display Method KR 20090010831 A (Lee Jeong Jae); Date Published: Jan. 30, 2009.*

* cited by examiner

*Primary Examiner* — Melur Ramakrishnaiah
(74) *Attorney, Agent, or Firm* — The Small Patent Law Group LLC; Dean D. Small

(57) ABSTRACT

An electronic device is provided that may include an output to present audio/video (AV) content, and a memory to store executable instructions. The electronic device can also provide a communications interface configured to communicate with a network resource, and one or more processors. The one or more processors when implementing the executable instructions are configured to obtain a camera characteristic related to a camera of a remote electronic device, and identify a condition present in the environment of interest of the remote electronic device based on the camera characteristic. The one or more processors are also configured to undertake a remedial action based on the condition identified.

21 Claims, 3 Drawing Sheets

DEVICE AND METHOD FOR CONTROLLING COMMUNICATION OF INFORMATION

BACKGROUND

Embodiments herein generally relate to devices and methods for controlling communication of information.

Electronic devices, such as laptop computers, mobile phones, personal digital assistants (PDAs), iPads, other computing devices, etc. have become part of many individuals' everyday life. Such electronic devices continue to be improved to make the experience of user as enjoyable as possible.

One way in which electronic devices are utilized is to provide communication outlets through voice over the Internet protocols (VOIPs), or video conference calling. In particular, as more individuals work from home, and more companies conduct business all over the globe, video conference calls utilizing Internet protocols have become part of normal operating procedure for companies world-wide. As a result, greater scrutiny on conference calls, and conference call conduct has occurred.

As an example, different individuals that conduct conference calls expect different behaviors from those participating on a call. For example, some individuals have no desire to be seen by coworkers during a call. As a result, such employees typically physically disable their camera, place tape or a post-it note over their camera, etc. to prevent others from seeing them during a call. When tape or a post-it are utilized, other members on the call are forced to look at the back of a piece of tape/post it all call, while bandwidth is expended even though nothing can be seen. Alternatively, many individuals just place their video call setting such that the video simply does not provide a video feed of the individual. Still, no indication is provided to other individuals on the call regarding why the video feed is not being utilized.

Meanwhile, some individuals desire to see other individuals during a meeting. Whether a teacher wants to ensure children are paying attention, a manager attempts to obtain thoughts about an idea including through non-verbal cues, or just individuals that prefer to physically see others during a meeting. For these individuals, when a screen is disabled, manually obstructed, is malfunctioning, or the like, frustrations can occur. As one example, a person participating in a call may have concern that an individual's camera or the conference calling application itself is malfunctioning, causing a negative user experience. To this end, individuals may even send messages to allow another individual to know their equipment is not working, when that individual just happened to disable their device. This just wastes time, and adds to frustrations.

SUMMARY

In accordance with embodiments herein, an electronic device is provided that may include an output to present audio/video (AV) content, and a memory to store executable instructions. The electronic device can also provide a communications interface configured to communicate with a network resource, and one or more processors. The one or more processors when implementing the executable instructions are configured to obtain a camera characteristic related to a camera of a remote electronic device, and identify a condition present in the environment of interest of the remote electronic device based on the camera characteristic. The one or more processors are also configured to undertake a remedial action based on the condition identified.

Optionally, the electronic device also includes a conference calling application including the executable instructions. In one aspect, the information related to the environment of interest of the remote electronic device includes a presence of a user, or the presence of an obstruction. In another aspect, the camera characteristic is based on information related to the environment of interest of the remote electronic device. In one example, to obtain the camera characteristic includes detecting the camera of the remote electronic device is malfunctioning. Alternatively to obtain the camera characteristic, the one or more processors are configured to communicate with the remote electronic device related to an operating state of the camera.

Optionally, the condition present in the environment includes the existence of an obstruction, existence of a malfunctioning camera, or existence of a camera that is in a first operating state. In one aspect, the remedial action is one of communicating a message to a user related to the condition identified, turning off communication of a signal from the camera, or replacing an image generated by the camera with a determined image related to a user of the remote electronic device. In another aspect, the one or more processors are further configured to obtain a determined image related to a user of the remote electronic device in response to identifying the condition; and displaying the determined image on the output. In one example, the determined image is maintained locally on the electronic device.

In accordance with embodiments herein, a method of managing communication of an electronic device is provided that include communicating with a remote electronic device via a network resource, and obtaining a camera characteristic related to a camera of the remote electronic device. The method also includes identifying a condition present in the environment of interest of the remote electronic device based on the camera characteristic, and undertaking a remedial action based on the condition identified.

Optionally, obtaining the camera characteristic includes detecting the camera of the remote electronic device is malfunctioning. Alternatively, obtaining the camera characteristic includes communicating with the remote electronic device related to an operating state of the camera. In one aspect, the method also includes obtaining a determined image related to a user of the remote electronic device in response to identifying the condition, and displaying the determined image on an output of the electronic device. In another aspect, the method also includes maintaining the determined image locally on the electronic device. In one example, the method also includes displaying an electronic message related to the condition identified on an output of the electronic device in response to identifying the condition. In another example, the method also includes preventing communication of information from the camera of the remote device in response to identifying the condition.

In accordance with embodiments herein, a computer program product is provided that includes a non-signal computer readable storage medium comprising computer executable code. When executed the executable code communicates with a remote electronic device via a network resource, and obtains a camera characteristic related to a camera of the remote electronic device. The executable code additionally identifies a condition present in the environment of interest of the remote electronic device based on the camera characteristic, and undertakes a remedial action based on the condition identified.

Optionally, to obtain the camera characteristic includes detecting the camera of the remote electronic device is malfunctioning. Alternatively, to obtain the camera characteristic includes communicating with the remote electronic device related to an operating state of the camera. In one example, the computer executable code when executed obtains a determined image related to a user of the remote electronic device in response to identifying the condition, and displays the determined image on an output of the electronic device.

DETAILED DESCRIPTION

Figure 1:
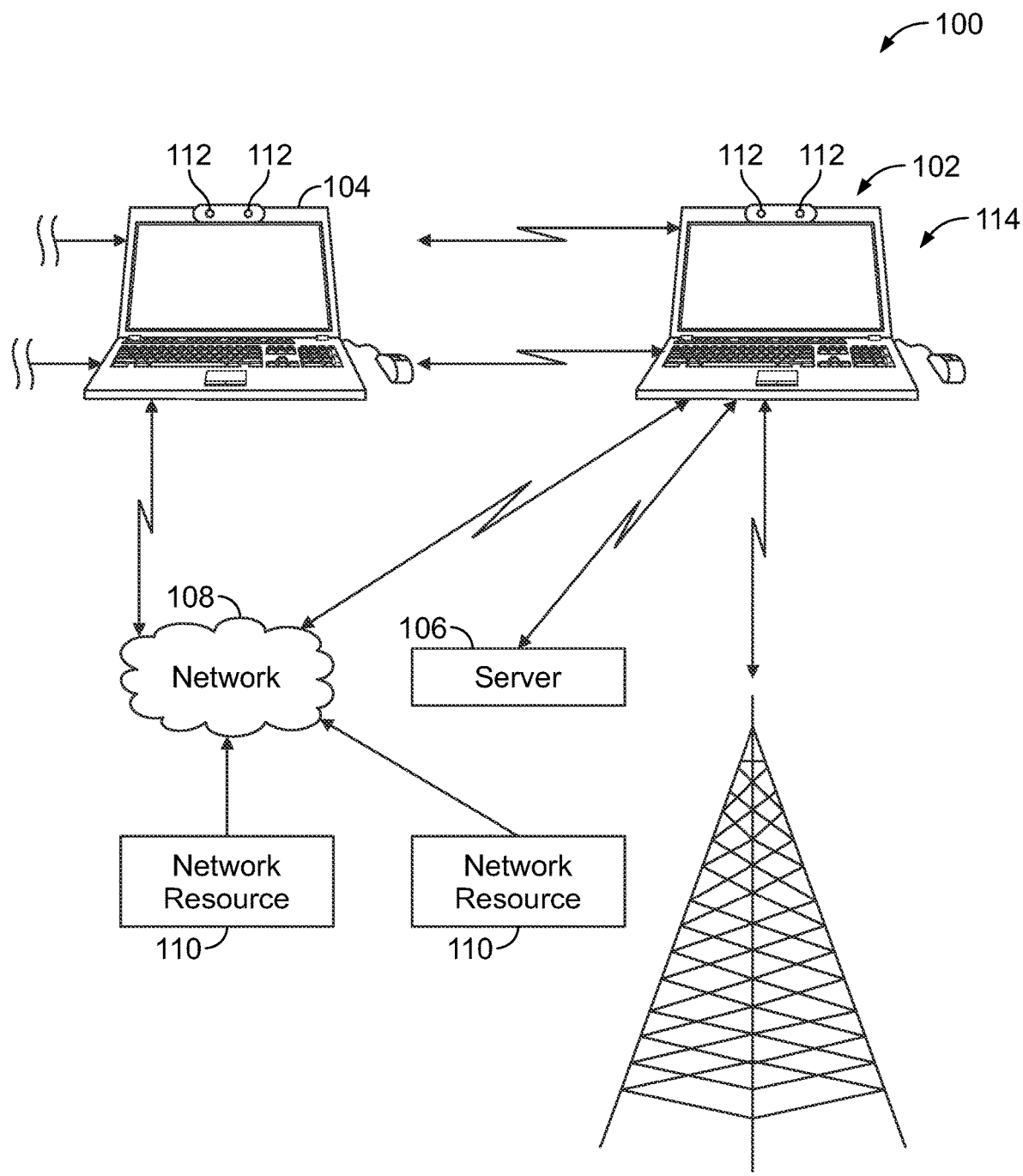
FIG. 1 illustrates a schematic block diagram of a system for controlling communications, in accordance with embodiments herein.

It will be readily understood that the components of the embodiments as generally described and illustrated in the figures herein, may be arranged and designed in a wide variety of different configurations in addition to the described example embodiments. Thus, the following more detailed description of the example embodiments, as represented in the figures, is not intended to limit the scope of the embodiments as claimed, but is merely representative of example embodiments.

Reference throughout this specification to "one embodiment" or "an embodiment" (or the like) means that a particular feature, structure, or characteristic described in connection with the embodiment is included in at least one embodiment. Thus, appearances of the phrases "in one embodiment," "in an embodiment" or the like in various places throughout this specification are not necessarily all referring to the same embodiment.

Furthermore, the described features, structures or characteristics may be combined in any suitable manner in one or more embodiments. In the following description, numerous specific details are provided to give a thorough understanding of the various embodiments. One skilled in the relevant art will recognize, however, that the various embodiments can be practiced without one or more of the specific details, or with other methods, components, materials, etc. In other instances, well-known structures, materials, or operations are not shown or described in detail to avoid obfuscation. The following description is intended only by way of example, and simply illustrates certain example embodiments.

The phrase "maintained locally on" shall mean only provided on an electronic device. With reference to signals, information, data, etc. each is kept in one or more processors, a memory, circuitry, or the like of an electronic device. In this manner, the signals, information, data, etc. are not provided to a network, communicated over a wire, wirelessly, or the like to a network, cloud, remote electronic device, or the like.

The terms "audio/video" and "AV" shall mean audio and/or video and shall include audio only, video only, or a combination of audio and video. For example, AV content may include 1) only audio content, with no video content 2) only video content, with no audio content, or 3) a combination of audio and video content. As another example, an AV output device may include a device to 1) output only audio content, and not video content, 2) output only video content, and not audio content, or 3) output a combination of audio and video content. As another example, an AV source may represent 1) a source that provides audio content but does not provide video content, 2) a source that provides video content but does not provide audio content, or 3) a source that provides both audio and video content.

The term "environment" refers to a physical region in which one or more electronic devices and AV output devices are located and in which AV content output by the AV output device(s) is perceived (e.g., heard, seen, felt) by individuals. By way of example, an environment may refer to one or more rooms within a home, office or other structure. An environment may or may not have physical boundaries. For example, an environment may instead be defined based upon a range over which individuals can perceive actions by electronic devices. When an electronic device is portable and/or handheld, an environment associated with the electronic device may shift over time when the electronic device is moved. For example, an environment surrounding a smart phone, tablet device or laptop computer moves with the smartphone, tablet device or laptop computer. An environment surrounding a electronic device will shift each time the electronic device is relocated, such as when moved between different rooms of a home, office building or other residential or commercial structure.

The term "camera characteristic(s)" refers to any and all attributes, parameters, traits, etc. that relate to a camera of an electronic device. Camera characteristics can include image data, type of camera, camera settings, camera operation, camera malfunctioning, changes in image data, changes in camera settings, changes in camera operation, or the like. Camera characteristics can be obtained directly through the camera, indirectly from a memory or information input into an electronic device or remote electronic device, calculated, determined, selected, identified, or the like.

The term "network resource" refers to any device, system, controller, etc. that may monitor and communicate data and information that is related to an individual. Network resources can include servers, applications, remote processors, the cloud, etc. The network resource may communicate with an electronic device over a wire, through one or more wireless protocols including Bluetooth, GSM, infrared wireless LAN, HIPERLAN, 4G, 5G, satellite, or the like.

The term "operating state" refers to a state of operation of a device. Nonlimiting examples of operational states can include being "ON" and permitting communication of information or signals to one or more local processors and network resources, being "ON" and permitting communication of information or signals to only one or more local processors, being "ON" and permitting communication of information or signals to only network resources, being "OFF" such that no information or signals are communicated at all, and the like.

The term "remote electronic device" refers to any and all electronic devices that are in communication with an electronic device through a resource network. The remote electronic device can be a mobile device, such as a cellular telephone, smartphone, tablet computer, personal digital assistant, laptop/desktop computer, gaming system, a media streaming hub device, IoT device, another electronic terminal that includes a user interface, or the like. The communication may be wire-based, wireless, over-the-air, etc. In one example, in an office setting a first individual may be using a first electronic device that is a laptop computer, and in the same environment is a second individual with a second laptop, both communicating through a conference calling application and coupled to one another through a resource network utilized by the conference calling application. In this example, even though the first electronic device and second electronic device share the same or similar environments, the first electronic device is an electronic device, while the second electronic device is a remote electronic device. In another example, the first electronic device is a table located in New York in the U.S. while the second electronic device is located in Beijing in China, and couple through a network resource. Thus, the New York electronic device can be considered an electronic device, and the Beijing electronic device considered a remote electronic device to the New York electronic device. At the same time, the Beijing electronic device can be considered the electronic device while the New York electronic device is considered a remote electronic device to the Beijing electronic device.

The term "condition" when described in relation to a camera refers to a state of the camera, or image provided by the camera, with regard to quality, working order, operating state, information obtained, etc. A condition of a camera can include presence of a covering or obstruction in a view field, existence of a user in a viewing field, existence of an environment in a viewing field, existence of malfunctioning of the camera whether the camera is not operational or partially operational, an operating state of a camera including an ON state and an OFF state, a setting of a camera that can also include an operating state, etc.

The term "remedial action" in relation to an electronic device refers to any action taken to present a better user experience of the electronic device. Remedial actions can include communicating a message to a user related to the condition identified, preventing the communication of information from the camera of the remote device, or replacing an image generated by the camera with a determined image related to a user of the remote electronic device, providing information to a user such as through an electronic message regarding the condition of the electronic device or a remote electronic device, any and all actions to reduce wear or bandwidth of an electronic device, any and all actions to provide best aesthetics to on an output, including replacing a black or blank screen with a determined image.

The term "obtains" and "obtaining", as used in connection with data, signals, information and the like, include at least one of i) accessing memory of an remote device or remote server where the data, signals, information, etc. are stored, ii) receiving the data, signals, information, etc. over a wireless communications link between the electronic device and a remote device, and/or iii) receiving the data, signals, information, etc. at a remote server over a network connection. The obtaining operation, when from the perspective of an electronic device, may include sensing new signals in real time, and/or accessing memory to read stored data, signals, information, etc. from memory within the electronic device. The obtaining operation, when from the perspective of a remote device, includes receiving the data, signals, information, etc. at a transceiver of the remote device where the data, signals, information, etc. are transmitted from a electronic device and/or a remote server. The obtaining operation may be from the perspective of a remote server, such as when receiving the data, signals, information, etc. at a network interface from a local external device and/or directly from an electronic device. The remote server may also obtain the data, signals, information, etc. from local memory and/or from other memory, such as within a cloud storage environment and/or from the memory of a personal computer.

It should be clearly understood that the various arrangements and processes broadly described and illustrated with respect to the Figures, and/or one or more individual components or elements of such arrangements and/or one or more process operations associated of such processes, can be employed independently from or together with one or more other components, elements and/or process operations described and illustrated herein. Accordingly, while various arrangements and processes are broadly contemplated, described and illustrated herein, it should be understood that they are provided merely in illustrative and non-restrictive fashion, and furthermore can be regarded as but mere examples of possible working environments in which one or more arrangements or processes may function or operate.

An electronic device and method are provided for VOIP, or video conference calling applications, where an initial analysis is conducted to determine camera characteristics associated with the camera of a remote electronic device. During the analysis, camera characteristics such as information in a video frame, video privacy settings of the remote electronic device, diagnostic checks to determine or detect if a malfunctioning feed is presented, etc. are obtained. In this manner, remedial actions can be undertaken depending on a condition determined based on the camera characteristics obtained. For example, if image frames are consistently dark, the system stops sending the live video feed and can replace the feed with a still image. The still image may be a determined image maintained locally on the electronic device and associated with the remote user, or can be communicated from the remote electronic device to be utilized in place of the dark screen. In another example, a placeholder image may instead be utilized. Still, the condition is identified by the electronic device and method at the beginning of a call, and in response to identifying the condition, a remedial action is undertaken.

FIG. 1 is a block diagram of a system 100 for controlling communication of information, in accordance with embodiments herein. The system 100 includes an electronic device 102, one or more remote electronic devices 104, and one or more servers 106. By way of example, the electronic device 102 may be a mobile device, such as a cellular telephone, smartphone, tablet computer, personal digital assistant, laptop/desktop computer, gaming system, a media streaming hub device, IoT device, or other electronic terminal that includes a user interface and is configured to access a network 108 over a wired or wireless connection. As non-limiting examples, the electronic device 102 may access the network 108 through a wireless communications channel and/or through a network connection (e.g. the Internet).

The electronic device 102 in one embodiment is in communication with a network resource 110 via the network. The network resource 110 can be a server, application, remote processor, the cloud, etc. In one example, the network resource 110 is one or more processors of the remote electronic device 104 that communicates over the network 108 with the electronic device 102. The network 108 may represent one or more of a local area network (LAN), a wide area network (WAN), an Intranet or other private network that may not be accessible by the general public, or a global network, such as the Internet or other publicly accessible network.

Additionally or alternatively, the electronic device 102 may be a wired or wireless communication terminal, such as a desktop computer, laptop computer, network-ready television, set-top box, and the like. The electronic device 102 may be configured to access the network using a web browser or a native application executing thereon. In some embodiments, the electronic device 102 may have a physical size or form factor that enables it to be easily carried or transported by a user, or the primary electronic device 102 may have a larger physical size or form factor than a mobile device.

The remote electronic device 104 similarly may be a mobile device, such as a cellular telephone, smartphone, tablet computer, personal digital assistant, laptop/desktop computer, gaming system, a media streaming hub device, IoT device, or other electronic terminal that includes a user interface and is configured to access the network 108 over a wired or wireless connection. As non-limiting examples, the remote electronic device 104 may also access the network 108 through a wireless communications channel and/or through a network connection (e.g. the Internet). The remote electronic device 104 in one embodiment is in communication with the network resource 110 via the network.

Additionally or alternatively, the remote electronic device 104 may be a wired or wireless communication terminal, such as a desktop computer, laptop computer, network-ready television, set-top box, and the like. The remote electronic device 104 may be configured to access the network using a web browser or a native application executing thereon. In some embodiments, the remote electronic device 104 may have a physical size or form factor that enables it to be easily carried or transported by a user, or the remote electronic device 104 may have a larger physical size or form factor than a mobile device.

The electronic device 102 and the remote electronic device 104 can each include one or more cameras 112. Each camera 112 obtains information related to an environment 114 of a user that is within the field of view of the camera. Each camera 112 may be a high-resolution red green blue (RGB) camera, high-resolution RGB wide-angle camera, etc. Each camera 112 can obtain image information within the field of view of the camera 112 and includes still frames, multiple frames, a continuous feed, or the like. Such image information may include just a black, darkened, or obstructed field of view when a piece of tape, post-it note, dirt and dust, other obstruction, or the like is placed in front of the camera 112. Alternatively, the image information can include the presence of a user, or multiple users within the environment 114. The environment 114 can include a room, indoors, outdoors, or other setting that is within the field of view of the camera 112.

Figure 2:
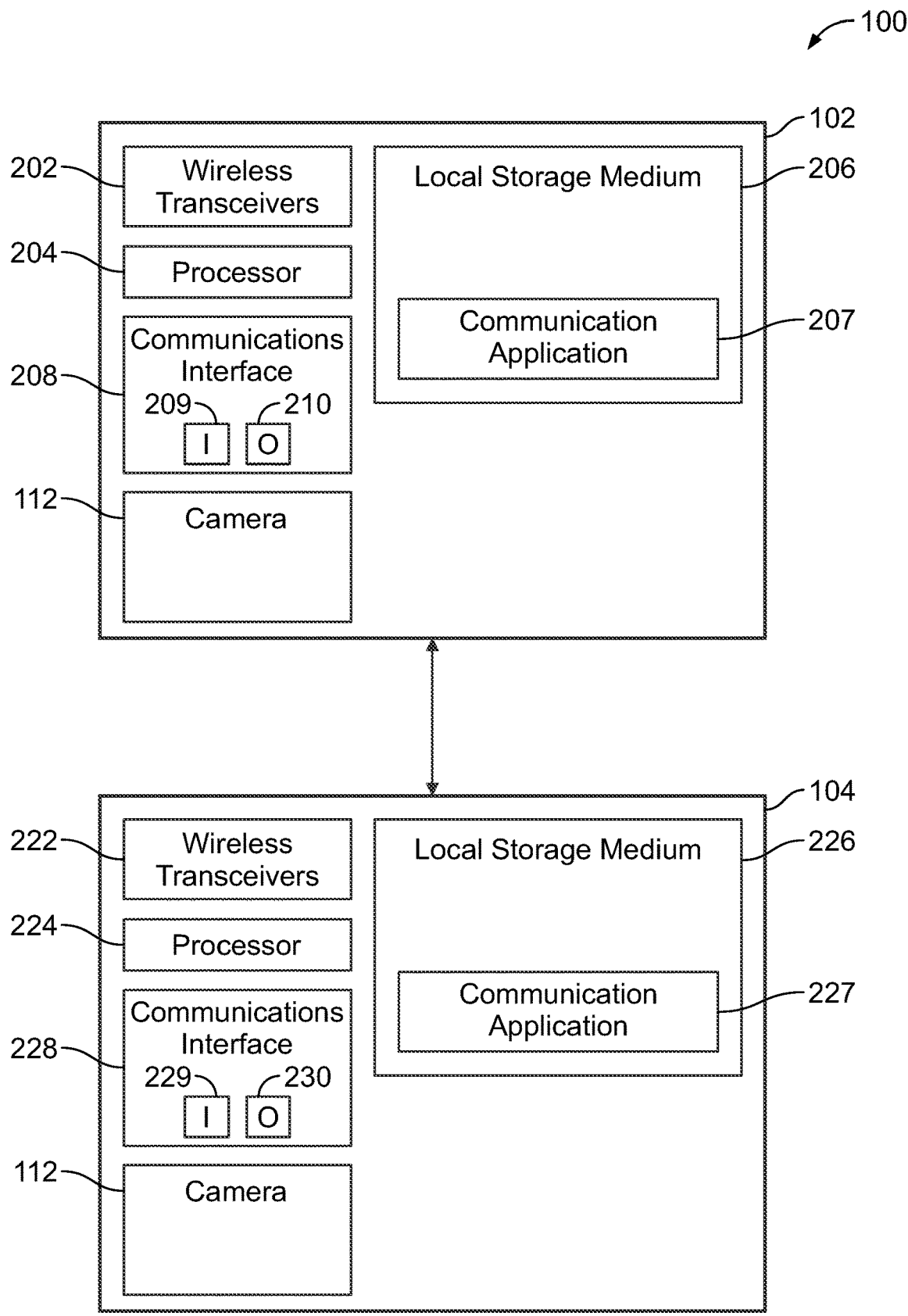
FIG. 2 illustrates a schematic block diagram of an electronic device, in accordance with embodiments herein.

FIG. 2 illustrates a simplified block diagram of the electronic device 102 and remote electronic device 104 of FIG. 1 in accordance with an embodiment. The electronic device 102 includes components such as one or more wireless transceivers 202, one or more processors 204 (e.g., a microprocessor, microcomputer, application-specific integrated circuit, etc.), and one or more local storage medium (also referred to as a memory portion) 206.

Each transceiver 202 can utilize a known wireless technology for communication. Exemplary operation of the wireless transceivers 202 in conjunction with other components of the electronic device 102 may take a variety of forms and may include, for example, operation in which, upon reception of wireless signals, the components of electronic device 102 detect communication signals from remote electronic devices 104 and the transceiver 202 demodulates the communication signals to recover incoming information, such as responses to inquiry requests, voice and/or data, transmitted by the wireless signals. The one or more processors 204 format outgoing information and convey the outgoing information to one or more of the wireless transceivers 202 for modulation to communication signals. The wireless transceiver(s) 202 convey the modulated signals to a remote device, such as a cell tower or a remote server (not shown).

The local storage medium 206 can encompass one or more memory devices of any of a variety of forms (e.g., read only memory, random access memory, static random access memory, dynamic random access memory, etc.) and can be used by the one or more processors 204 to store and retrieve data. The data that is stored by the local storage medium 206 can include, but need not be limited to, operating systems, applications, obtained data, camera characteristics, and informational data. Each operating system includes executable code that controls basic functions of the device, such as interaction among the various components, communication with external devices via the wireless transceivers 202, and storage and retrieval of applications and context data to and from the local storage medium 206.

In one example, the local storage medium 206 stores a communication application 207 that includes program instructions that may be implemented by the one or more processors 202. In one example the communication application 207 is a video conference calling application that includes VOIP, whereas in another example, the communication application is separate from a video conference calling application and works in conjunction with such a video conference calling application.

The communication application 207 communicates with the remote electronic device 104 to determine a condition associated with the camera 112 of the remote electronic device 104 based on camera characteristics. For example, the communication application 207 can be utilized to analyze still images, or an image feed to determine if an environment 114 can be detected, a user can be detected, if an obstruction is detected, or the like. Similarly, the communication application 207 may determine or have the privacy settings of a communication application within the remote electronic device 104 communicated to the one or more processors 202. In yet another example, the communication application 207 may communicate with the remote electronic device 104 to determine if a camera 112 of the remote electronic device 104 is malfunctioning, or not operating correctly. Such malfunctioning can include interruptions in a video feed, a distorted image, a portion of an image missing, or the like.

Based on receiving the camera characteristics, the communication application 207 can make determinations, and identify conditions related to the camera 112 of the remote electronic device 104. Such conditions can include a covered camera, a camera that is in an OFF operating state, a malfunctioning camera, a disrupted video feed, or the like. Then based on the identification of the conditions, remedial actions may be undertaken. Remedial actions can include communicating a message to a user related to the condition identified, preventing the communication of information from the camera of the remote device, replacing an image generated by the camera with a determined image related to a user of the remote electronic device, sending an electronic message to a user related to the condition, or the like. The electronic message can be a pop-up message, electronic mail message (email), text message, etc. In another example, the remedial action is to prevent, or stop communication, video feeds, etc. from the remote electronic device 104 to the electronic device 102. In another example, the remedial action may be placing a determined image such as a determined still photo chosen by a remote user, or determined by the communication application, in place of the video feed from the remote electronic device 104. The determined image in one example is maintained locally on the electronic device within the storage medium 206.

In one example, the local storage medium 206 includes a user profile, along with profiles of users of remote electronic devices. The user profile can include user settings, including whether the user desires to operate a camera of the electronic device in an ON operating state or an OFF operating state during a video conference call. Such a setting may be considered as a default setting. The profile may also include user information such as username, a determined image such as a profile picture that can be used instead of a video feed, user preferences, or the like. In this manner, a communication application of a remote electronic device can obtain the user profile to make a communication experience more appeasing for a remote user. For example, if the user operates the electronic device 102 in an OFF setting during a video conference call, the determined image, name of the user, or combination thereof, may be accessed from the profile, and displayed for the remote electronic device user. In this manner, a user has the choice of what a profile picture may look like so they can ensure a professional picture of them is presented.

In another example, the local storage medium 206 may also include remote user profiles. Such remote profiles can include a username, determined image, etc. In particular, if a remote user does not have a remote user profile that can be obtained, the electronic device 102 may obtain information about the remote user to compile a remote user profile. For example, if a person provides their name to a communication application 207, this may be stored. The communication application 207 may include functionality to search in emails, webpages visited by the user, information inputted by the user, or the like to identify information related to the user of the remote device. This remote user profile can then be utilized to replace a video feed when such a video feed is not being utilized by a remote user.

The electronic device 102 in one embodiment also includes a communications interface 208 that is configured to communicate with a network resource (FIG. 1). The communications interface 208 can include one or more input devices 209 and one or more output devices 210. The input and output devices 209, 210 may each include a variety of visual, audio, and/or mechanical devices. For example, the input devices 209 can include a visual input device such as an optical sensor or camera, an audio input device such as a microphone, and a mechanical input device such as a keyboard, keypad, selection hard and/or soft buttons, switch, touchpad, touch screen, icons on a touch screen, a touch sensitive areas on a touch sensitive screen and/or any combination thereof. Similarly, the output devices 210 can include a visual output device such as a liquid crystal display screen, one or more status indicators that may be light elements such as light emitting diodes, an audio output device such as a speaker, alarm and/or buzzer, and a mechanical output device such as a vibrating mechanism. The display may be touch sensitive to various types of touch and gestures.

As further examples, the output device(s) 210 may include a touch sensitive screen, a non-touch sensitive screen, a text-only display, a smart phone display, an audio output (e.g., a speaker or headphone jack), and/or any combination thereof. The communication application 207 in one example is accessed through the input device 209, and messages related to the communication application 207, including remedial action messages, are presented on the output device 210. All of these components can be operatively coupled to one another, and can be in communication with one another, by way of one or more internal communication links, such as an internal bus. Additionally, electronic device 102 includes a camera 112. Such a camera may be a high-resolution red green blue (RGB) camera, high-resolution RGB wide-angle camera, etc.

The remote electronic device 104 meanwhile also can include wireless transceivers 222, one or more processors 224, and a local storage medium 226 that can include a communication application 227. These components can function as described in relation to the electronic device 104. Similarly, the remote electronic device 104 also includes a communications interface 228 with input 229 and output devices 230.

The remote electronic device 104 additionally includes one or more cameras 112. The one or more cameras 112 of the remote electronic device 104 function to obtain image information such as the presence of the user at the remote electronic device 104, environmental information or data, or the like. The one or more processors 204 of the electronic device 102 can then obtain this image information and data from the one or more cameras 112 of the remote electronic device. In one example, by obtaining information related to the environment of interest, the one or more processors 204 can determine a profile related to an individual in order to determine user information, including a profile picture that may be utilized by the communication application 207 when the camera 112 of the remote electronic device 104 is not providing a video feed of the user of the remote electronic device 104. In addition, a profile may be related to an individual, including the operating settings for the first for the camera, including a first operating state being an OFF operating state, and a second operating state being an ON operating state. In this manner, when the profile is provided to the communication application 207, a determination can be made that the user of the remote electronic device 104 has the camera turned off, and this is the reason no video feed is provided.

In addition, in one example, the communication application 207 of the electronic device 102 communicates and obtains information and data related to the user of the remote device 104, the environment of the remote device, etc. from the communication application 227 of the remote device 104. In another example, the communication application 227 of the remote electronic device 104 may obtain information from the communication application 207 of the electronic device 102, including image information from the camera 112 of the electronic device 102. In this manner, the electronic device 102 is a remote electronic device to the remote electronic device 104. Specifically, each electronic device 102, 104 can share information over a network 108 to enhance the video teleconference meeting experience. Still, the communication application 207 is still able to obtain image information and data from a remote device 104 that does not include a communication application.

Figure 3:
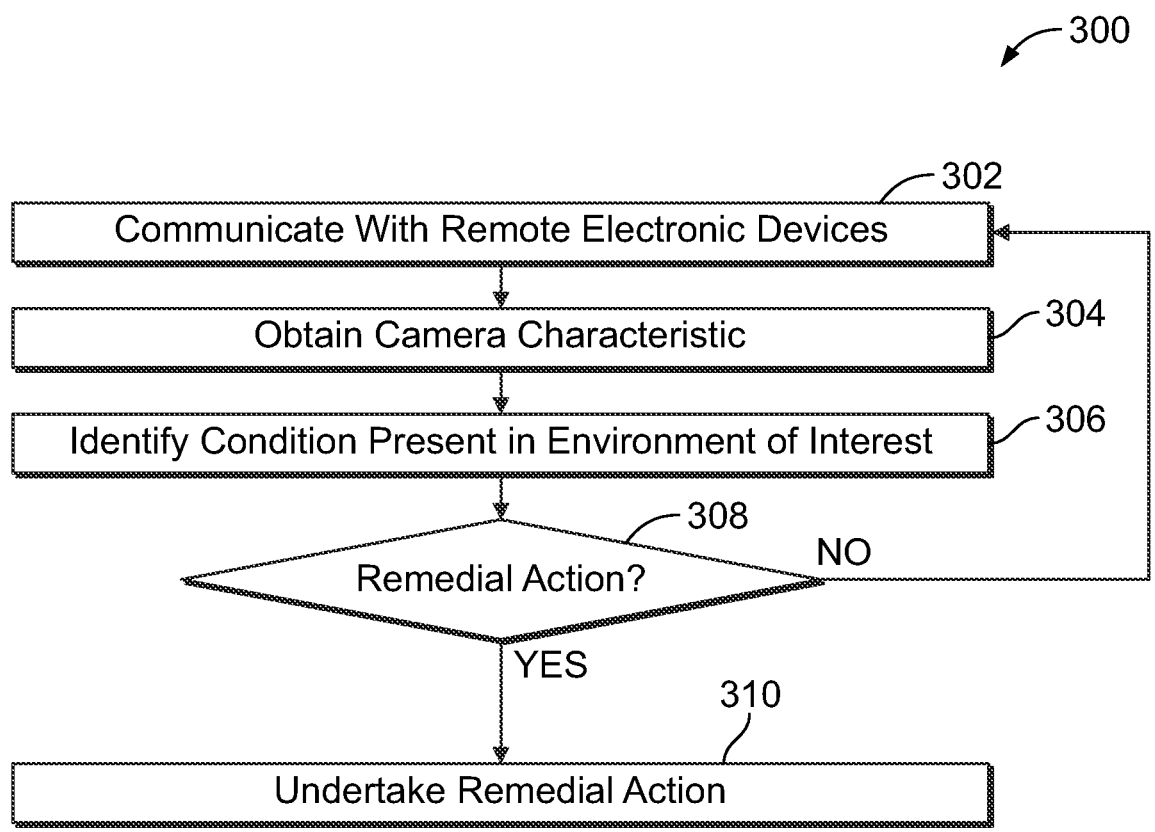
FIG. 3 illustrates a block diagram of a method for controlling communication, in accordance with embodiments herein.

FIG. 3 illustrates a block diagram of a method 300 of controlling communication information. The method 300 may be implemented utilizing the communication application of the electronic device of FIGS. 1 and 2.

At 302, one or more processors communicate with one or more remote electronic devices in response to the launching of a video teleconference communication application. In one example, the video teleconference communication application is on an electronic device of the user, and upon launching a meeting begins communicating with remote electronic devices that are participating in the meeting. In another example, a separate communication application on the electronic device of the user detects when the video teleconference communication application is launched, or in use, and in response, communicates with the remote electronic devices that are also part of the video teleconference. In one example, a remote electronic device communicates information over the network and into a cloud, and the electronic device communicates with the remote electronic device by accessing the information in the cloud. In this manner, information does not have to be directly communicated between the electronic device of the user and a remote electronic device for the one or more processors to communicate with the remote electronic device.

At 304, the one or more processors obtain a camera characteristic related to a camera of a remote electronic device. Camera characteristics can include image data, type of camera, camera settings, camera operation, camera malfunctioning, changes in image data, changes in camera settings, changes in camera operation, or the like. Camera characteristics can be obtained directly through the camera, indirectly from a memory or information input into an electronic device or remote electronic device, calculated, determined, selected, identified, or the like.

In one example, the camera characteristic is whether the field of view of the camera is obstructed, or partially obstructed. Such camera characteristic may be obtained by analysis of still frames of the camera, multiple still frames, a video feed, or the like along with the use of image identification technology. Therefore, if the camera is being obstructed by an obstruction such as a piece of tape, a post-it note, shutter, mechanical obstruction, dust or dirt, or the like, such camera characteristic can be obtained.

In another example, the camera characteristic is a camera setting. The camera setting can be of a setting of a remote electronic device itself, a setting in a communication application, a setting in a video teleconference conference communication application, within a personal profile, or the like. In one embodiment the setting can be related to a privacy setting. In another embodiment, the setting is related to an operating state, including a first operating state that can be an ON operating state, and a second operating state that can be an OFF operating state. Such settings may be obtained from a communication from the remote electronic device, such as from a communication application. Alternatively, the settings may be obtained from a remote user profile that may be in the memory of the electronic device, in the memory of the remote electronic device, in a communication application of the electronic device or of a remote electronic device, or the like. In yet another example, the settings may be obtained by accessing the settings of the remote electronic device.

In yet another example, the camera characteristic is related to the health of the camera. In one embodiment, the remote electronic device communicates with the communication application to provide diagnostic information related to the camera. In this manner, if the camera is malfunctioning for any reason, a communication application at the remote electronic device can communicate such information through the network to the communication application of the electronic device to allow the determination of the malfunctioning camera. Alternatively, the communication application may obtain access and perform a diagnostic analysis on the remote electronic device. In yet another example, the communication application may receive settings information that the camera is enabled; however, no image information or data is being communicated from the camera to the electronic device. As a result, a determination can be made that the camera must be malfunctioning. Such a determination may be made utilizing an algorithm, mathematical formula, mathematical model, lookup table, decision tree, mathematical formula, or the like. In each instance, a camera characteristic is obtained. The camera characteristic can be obtained through a determination, detection, input, communication, or the like.

At 306, the one or more processors identify a condition present in the environment of interest of the remote electronic device based on the camera characteristic. The condition can be the presence of an individual, the presence of an obstruction in an image, the operational state of the camera including an ON state and an OFF state, a malfunctioning camera, a non-operational camera, or the like. In some examples, the camera characteristic is the condition present. For an example, if a camera is malfunctioning, the malfunctioning camera is both a camera characteristic and a condition present in the environment of interest. In particular, a camera characteristic can be utilized to determine the condition, but is not necessarily the condition itself. For example, image data can be considered a camera characteristic, but not a condition, whereas the presence of a user detected from the image data is both a camera characteristic and condition.

At 308, the one or more processors determine if a remedial action is required. In particular, based on the condition, a determination is made whether to take action to remedy the condition. If no remedial action is required, then the one or more processors continue to communicate with the remote electronic device for any changes or new conditions based on obtaining the camera characteristics. For example, if the condition determined is that a user is sitting at their remote electronic device ready to participate in the meeting, no additional action is undertaken. Instead, the one or more processors simply continue to communicate with the remote electronic device of the remote user to obtain the camera characteristics. In this manner, if the camera malfunctions during a conference call, if an individual changes their settings from an ON state to and OFF state, if an individual obstructs the camera during the meeting, physically leaves the meeting, or the like, remedial actions may still be undertaken.

If a 308, the one or more processors determine a remedial action is required, then at 310, the one or more processors undertake the remedial action. For example, when a condition is presented that the camera of the remote electronic device is obstructed, malfunctioning, in an OFF operating state, etc. the communication application can prevent communication of information from the camera of the remote device in response to identifying the condition. In this manner, bandwidth, battery, etc. are saved. In addition, the communication application may, in response to the condition, obtain a substitute image, and replace a black or blank feed with the substitute image. In one example, the remote electronic device may include a determined image associated with the user of the remote electronic device. Alternatively, the user of the electronic device, may have a determined image that they desire to have in place when an individual's camera is not providing a video feed. In yet another example, the communication application can obtain information related to user of the remote device to provide the image, message, words, or the like displayed. In another example, the remedial action may be communicating a message that the camera of the remote electronic device is malfunctioning. Such a message may be in the form of a pop up, electronic mail (e.g. email), text message, or the like.

The message may be communicated to the user of the electronic device, the user of the remote device, a third party provider that repairs malfunctioning cameras, etc. Such determinations of remedial actions may be made utilizing an algorithm, mathematical formula, mathematical model, lookup table, decision tree, mathematical formula, or the like. In each instance, a camera characteristic is obtained.

Based on the condition, the one or more processors undertake remedial actions to make the user experience more enjoyable. Specifically, the user experience is based on how a user feels when utilizing an electronic device. For example, if a user is frustrated, confused, annoyed, angry, etc. a negative association is provided with the use of the communication application. By taking remedial actions, such frustration, confusion, annoyance, anger, or the like can be reduced, improving the user experience. For example, by providing information, a message, or the like, about a remote device, confusion, and thus frustrations and annoyance can be reduced, improving a user experience. In another example, a new image that is more aesthetically pleasing provides a positive user experience instead of looking at the back of a piece of tape, that can provide a negative user experience. Providing information to the user regarding what is occurring to facilitate repair also provides a positive user experience, because a solution to a problem is provided instead of a user simply being alerted a problem is present.

As will be appreciated, various aspects may be embodied as a system, method or computer (device) program product. Accordingly, aspects may take the form of an entirely hardware embodiment or an embodiment including hardware and software that may all generally be referred to herein as a "circuit," "module" or "system." Furthermore, aspects may take the form of a computer (device) program product embodied in one or more computer (device) readable data storage device(s) having computer (device) readable program code embodied thereon.

Any combination of one or more non-signal computer (device) readable mediums may be utilized. The non-signal medium may be a data storage device. The data storage device may be, for example, an electronic, magnetic, optical, electromagnetic, infrared, or semiconductor system, apparatus, or device, or any suitable combination of the foregoing. More specific examples of a data storage device may include a portable computer diskette, a hard disk, a random access memory (RAM), a dynamic random access memory (DRAM), a read-only memory (ROM), an erasable programmable read-only memory (EPROM or Flash memory), a portable compact disc read-only memory (CD-ROM), an optical storage device, a magnetic storage device, or any suitable combination of the foregoing.

Program code for carrying out operations may be written in any combination of one or more programming languages. The program code may execute entirely on a single device, partly on a single device, as a stand-alone software package, partly on single device and partly on another device, or entirely on the other device. In some cases, the devices may be connected through any type of network, including a local area network (LAN) or a wide area network (WAN), or the connection may be made through other devices (for example, through the Internet using an Internet Service Provider) or through a hard wire connection, such as over a USB connection. For example, a server having a first processor, a network interface and a storage device for storing code may store the program code for carrying out the operations and provide this code through the network interface via a network to a second device having a second processor for execution of the code on the second device.

Aspects are described herein with reference to the figures, which illustrate example methods, devices and program products according to various example embodiments. These program instructions may be provided to a processor of a general purpose computer, special purpose computer, or other programmable data processing device or information handling device to produce a machine, such that the instructions, which execute via a processor of the device implement the functions/acts specified. The program instructions may also be stored in a device readable medium that can direct a device to function in a particular manner, such that the instructions stored in the device readable medium produce an article of manufacture including instructions which implement the function/act specified. The instructions may also be loaded onto a device to cause a series of operational steps to be performed on the device to produce a device implemented process such that the instructions which execute on the device provide processes for implementing the functions/acts specified.

The units/modules/applications herein may include any processor-based or microprocessor-based system including systems using microcontrollers, reduced instruction set computers (RISC), application specific integrated circuits (ASICs), field-programmable gate arrays (FPGAs), logic circuits, and any other circuit or processor capable of executing the functions described herein. Additionally or alternatively, the modules/controllers herein may represent circuit modules that may be implemented as hardware with associated instructions (for example, software stored on a tangible and non-transitory computer readable data storage device, such as a computer hard drive, ROM, RAM, or the like) that perform the operations described herein. The above examples are exemplary only, and are thus not intended to limit in any way the definition and/or meaning of the term "controller." The units/modules/applications herein may execute a set of instructions that are stored in one or more storage elements, in order to process data. The storage elements may also store data or other information as desired or needed. The storage element may be in the form of an information source or a physical memory element within the modules/controllers herein. The set of instructions may include various commands that instruct the modules/applications herein to perform specific operations such as the methods and processes of the various embodiments of the subject matter described herein. The set of instructions may be in the form of a software program. The software may be in various forms such as system software or application software. Further, the software may be in the form of a collection of separate programs or modules, a program module within a larger program or a portion of a program module. The software also may include modular programming in the form of object-oriented programming. The processing of input data by the processing machine may be in response to user commands, or in response to results of previous processing, or in response to a request made by another processing machine.

It is to be understood that the subject matter described herein is not limited in its application to the details of construction and the arrangement of components set forth in the description herein or illustrated in the drawings hereof. The subject matter described herein is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items.

It is to be understood that the above description is intended to be illustrative, and not restrictive. For example, the above-described embodiments (and/or aspects thereof) may be used in combination with each other. In addition, many modifications may be made to adapt a particular situation or material to the teachings herein without departing from its scope. While the dimensions, types of materials and coatings described herein are intended to define various parameters, they are by no means limiting and are illustrative in nature. Many other embodiments will be apparent to those of skill in the art upon reviewing the above description. The scope of the embodiments should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects or order of execution on their acts.

What is claimed is:

1. An electronic device, comprising:
   an output to present audio/video (AV) content;
   memory to store executable instructions;
   a communications interface configured to communicate with a network resource;
   one or more processors, when implementing the executable instructions, to:
   obtain a camera characteristic related to a camera of a remote electronic device;
   identify a condition present in an environment of interest of the remote electronic device based on the camera characteristic; and
   undertake a remedial action in response to the condition identified.

2. The electronic device of claim 1, further comprising a video conference calling application including the executable instructions.

3. The electronic device of claim 1, wherein the information related to the environment of interest of the remote electronic device includes a presence of a user, or the presence of an obstruction.

4. The electronic device of claim 1, wherein the camera characteristic is based on information related to the environment of interest of the remote electronic device.

5. The electronic device of claim 1, wherein to obtain the camera characteristic includes determining the camera of the remote electronic device is malfunctioning.

6. The electronic device of claim 1, wherein to obtain the camera characteristic, the one or more processors are configured to communicate with the remote electronic device related to an operating state of the camera.

7. The electronic device of claim 1, wherein the condition present in the environment includes the existence of an obstruction, existence of a malfunctioning camera, or existence of a camera that is in a first operating state.

8. The electronic device of claim 1, wherein the remedial action is one of communicating a message to a user related to the condition identified, preventing the communication of information from the camera of the remote device, or replacing an image generated by the camera with a determined image related to a user of the remote electronic device.

9. The electronic device of claim 1, wherein the one or more processors are further configured to obtain a determined image related to a user of the remote electronic device in response to identifying the condition; and displaying the determined image on the output.

10. The electronic device of claim 9, wherein the determined image is maintained locally on the electronic device.

11. A method of managing communication of an electronic device comprising:
   communicating with a remote electronic device via a network resource;
   obtaining a camera characteristic related to a camera of the remote electronic device;
   identifying a condition present in the environment of interest of the remote electronic device based on the camera characteristic; and
   undertaking a remedial action with the electronic device in response to the condition identified.

12. The method of claim 11, wherein obtaining the camera characteristic includes detecting the camera of the remote electronic device is malfunctioning.

13. The method of claim 11, wherein obtaining the camera characteristic includes communicating with the remote electronic device related to an operating state of the camera.

14. The method of claim 11, further comprising:
   obtaining a determined image related to a user of the remote electronic device in response to identifying the condition; and
   displaying the determined image on an output of the electronic device.

15. The electronic device of claim 11, further comprising:
   displaying an electronic message related to the condition identified on an output of the electronic device in response to identifying the condition.

16. The electronic device of claim 11, further comprising:
   preventing communication of information from the camera of the remote device in response to identifying the condition.

17. The electronic device of claim 13, further comprising maintaining the determined image locally on the electronic device.

18. A computer program product comprising a non-transitory computer readable storage medium comprising computer executable code to:
   communicate with a remote electronic device via a network resource;
   obtain a camera characteristic related to a camera of the remote electronic device;
   identify a condition present in an environment of interest of the remote electronic device based on the camera characteristic; and
   undertake a remedial action with an electronic device in response to the condition identified in the environment of interest.

19. The computer program product of claim 18, wherein to obtain the camera characteristic includes detecting the camera of the remote electronic device is malfunctioning.

20. The computer program product of claim 18, wherein to obtain the camera characteristic includes communicating with the remote electronic device related to an operating state of the camera.

21. The computer program product of claim 18, the computer executable code further to:
   obtain a determined image related to a user of the remote electronic device in response to identifying the condition; and display the determined image on an output of the electronic device.

\* \* \* \* \*